April 26, 1960 C. E. SCHOU 2,933,952
VEHICLE DRIVE TRAINS
Filed July 16, 1956 2 Sheets-Sheet 1

INVENTOR
CARL E. SCHOU
BY Strauch, Nolan & Neale
ATTORNEYS

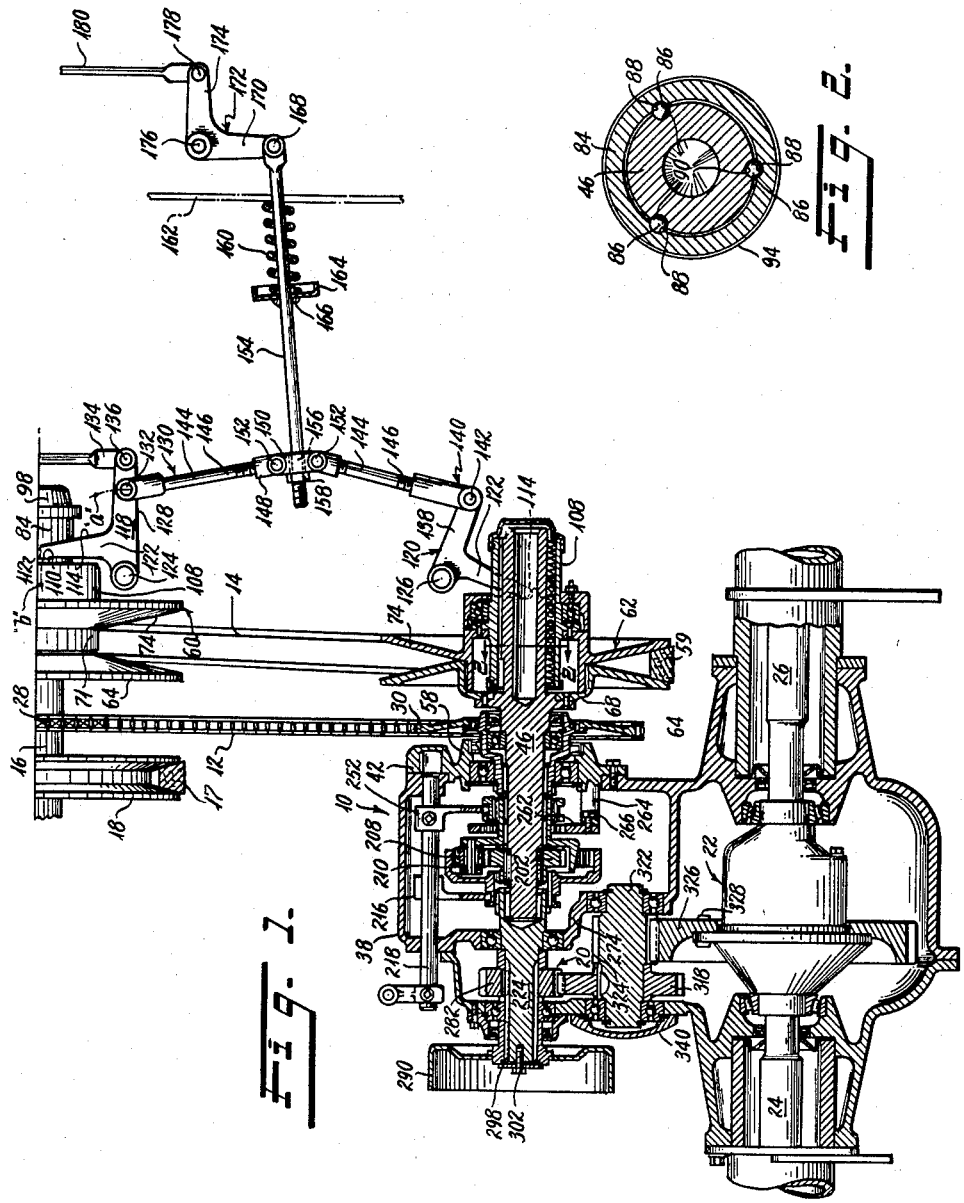

United States Patent Office 2,933,952
Patented Apr. 26, 1960

2,933,952

VEHICLE DRIVE TRAINS

Carl E. Schou, Oshkosh, Wis., assignor to Rockwell-Standard Corporation, a corporation of Pennsylvania Application July 16, 1956, Serial No. 598,157

6 Claims. (Cl. 74—689)

This invention relates to improvements in vehicle drive trains and has particular reference to infinitely variable speed mechanical transmissions.

The transmission of the present invention, as shown, is adapted for use in the drive train of low speed agricultural vehicles. In such vehicles which are adapted for crop harvesting, for example harvester combines, the engine should be governed at a relatively smooth constant controlled speed to provide power for the crop harvesting components such as the header conveyor, separator, elevator, grain line and the blower. Hence any means provided for vehicle speed adjustment must be provided between the controlled speed power take-off from the governed engine and the vehicle driving wheels.

Pre-existing combine propulsion drives, as a rule, consist of a manually operated transmission having from four to six speeds, a manually operated clutch and finally an infinitely variable speed drive with a maximum ratio spread equal to the magnitude of the steps in the transmission gear box. During operation in the field with such units, the operator must constantly adjust the speed of the vehicle for maximum combine efficiency. While this is difficult when operating on terrain which is generally level, when operating on hilly or uneven terrain, it is particularly difficult to continually select the correct drive ratio. These four to six speed transmissions are heavy, far too heavy where lighter units are much desired. The drive belts in combine drives which carry the full drive load and are used to obtain the infinitely variable speed drive within the spread of the reduction ratio steps in the transmission gear box are subject to greater wear than with other working parts in such drives.

The primary object of this invention is, therefore, to provide an improved infinitely variable speed mechanical transmission.

Another object is to provide an improved infinitely variable speed mechanical transmission adapted for use in agricultural vehicles particularly crop harvesting vehicles such as harvester combines.

A further object is to provide for crop harvesting vehicles such as combines driven by a substantially constant speed engine, an improved transmission having a high range of vehicle speeds for highway travel from job to job, a low range of vehicle speed for harvesting operation, and a reverse speed range.

Another object is to provide a transmission for a crop harvesting vehicle of such improved construction that the necessity for declutching at working speeds to change reduction ratios is eliminated.

A further object is to provide, in a crop harvesting vehicle, a variable speed transmission of such improved construction that the need for changing tires and concomitant necessity of transfer gearing changes on a combine vehicle for different crops, such as rice, wheat, etc., heretofore necessary, are eliminated.

A further object is to provide a new improved variable speed power drive mechanism which provides from a constant speed input shaft an output having an infinite number of speeds from a maximum speed in forward to a maximum speed in reverse any speed of which may be selected by a single speed lever control.

Another object is to provide a new improved variable V belt moveable sheave disk anti-friction speed control.

These and other objects of the invention will become more fully apparent by reference to the appended claims and as the following detailed description of the invention proceeds in reference to the drawings wherein:

Figure 1 is a sectional view of my new improved infinitely variable speed mechanical transmission as adapted for use in a harvester combine;

Figure 2 is a sectioned view taken along line 2—2 in Figure 1 which illustrates moveable sheave disc and antifriction mount detail.

Figure 1A:
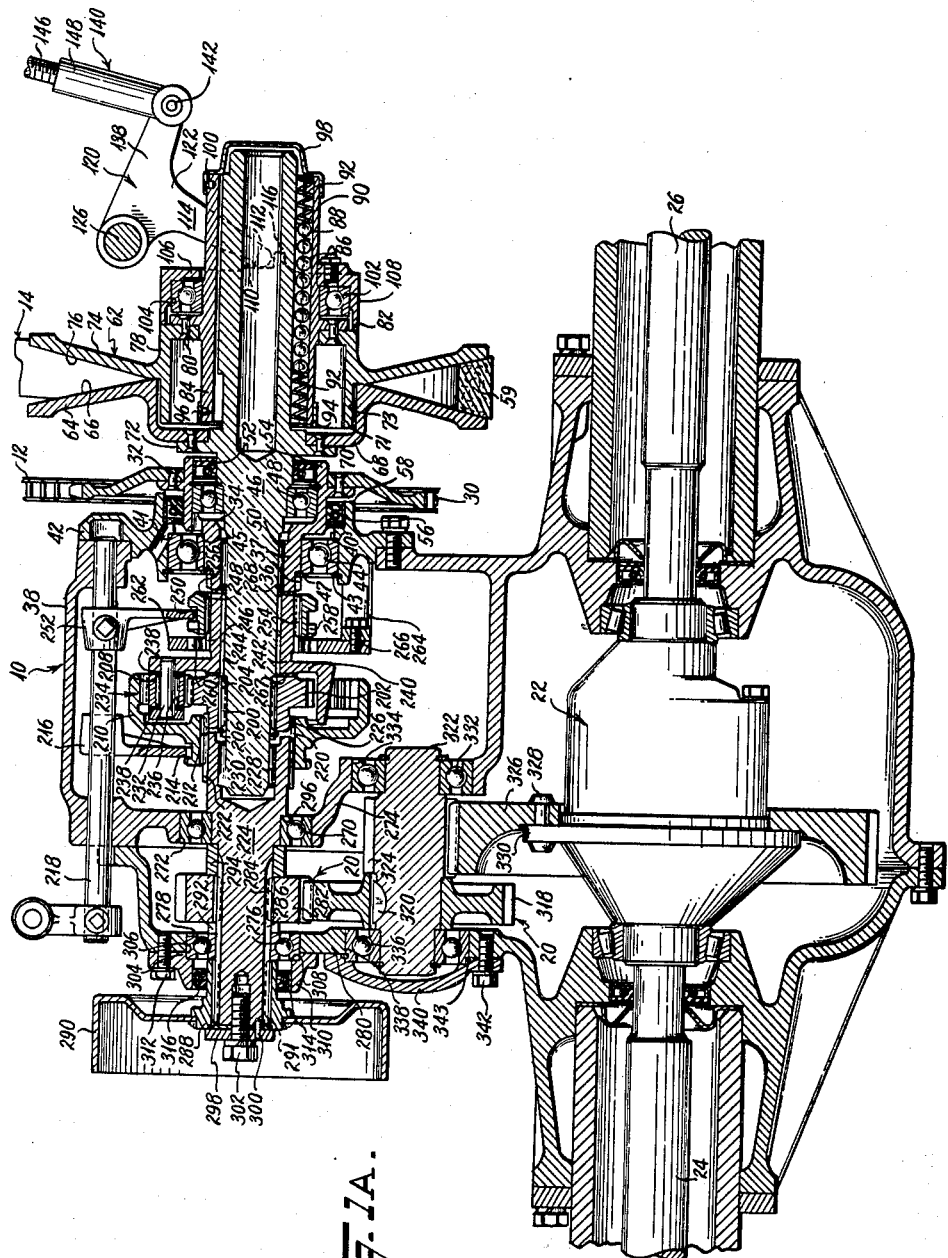
Figure 1A is an enlarged section of the axle and transmission mechanism of Figure 1.

Referring now to the drawings in detail, my new improved power drive train for harvester combines, comprises, in general, a transmission 10 which is provided with two parallel drive inputs 12 and 14 from the same driving shaft 16 which is driven by a belt 17 from a constant speed engine to pulley 18 and the output of which is drive connected by transfer and reduction gearing 20 to differential 22 from which opposite axle shafts 24 and 26 extend for driving connection with ground engaging wheels (not shown).

Drive input 12 is a link belt roller chain driven by chain gear (sprocket) 28 and drivingly connected to chain gear (sprocket) 30. Gear (sprocket) 30 is fixed by rivets 32 to one end of transmission tubular input member 34 which is equipped, at its opposite end, with external clutch teeth 36 on extended shank 37 within the planetary gear box (transmission 10) and differential housing member 38. Tubular input member 34 is journalled in opening 40 of housing end plate 42 by ball bearing 44 the outer race of which is axially retained in opening 40 between shoulder 41 and internal snap ring 43 and the inner race of which is axially retained on shank 37 between shoulder 45 and snap ring 47. Support and alignment between member 34 and planetary transmission input shaft 46 is maintained by ball bearing 48 and needle bearing 50. Oil seal 52 prevents loss of oil between hub portion 54 of member 34 and input shaft 46 and oil seal 56 prevents loss of oil between outer lip 58 of opening 40 and member 34.

Drive input 14 is formed by a drive belt 59, driven by adjustable V-belt type varispeed pulley 60 mounted on driving shaft 16, which in turn drives adjustable V-belt type varispeed pulley 62 mounted on and drive connected to input shaft 46. Pulleys 60 and 62 are identical so that the following detailed description of the structure of pulley 62 will suffice for both. Pulley 62 has an axially fixed sheave disk 64 with frusto conical belt engaging surface 66 and axially displaced hub 68 which is coaxially fixed by rivets 70 to flange 72 which is integral with shaft 46. The other sheave disk 74 of pulley 62 is formed with a frusto conical belt engaging surface 76 and is axially movable relative to disk 64 for pulley adjustment. Disk 74 has an axially displaced hub 78 which is coaxially fixed by rivets 80 to flange 82 of axially displaceable tubular member 84. This member 84 is keyed to shaft 46 by three equiangularly spaced axially extending rows of balls 86 which are retained in alignment by radially complementary internal grooves 88 in member 84 and external grooves 90 in shaft 46. Opposed coil springs 92, one at each end of each row of balls 86, resiliently maintain the axial assembled position of balls 86 with respect to grooves 88 and are retained in grooves 88 by, at the inner end of member 84, a spring retainer 94 which is fastened to member 84 by symmetrically spaced detent means 96 and, at the outer end of member 84, by a cup shaped spring retaining member 98, which is fastened to member 84 by symmetrically spaced detent means 100. This anti-friction means of keying an axially adjustable sheave disk to a shaft mounts the sheave so there is no sliding contact that may cause wear and rocking. In addition the sheave mount members will not stick, seize or gall when operated at a fixed speed setting for long periods of time, even though no lubrication is required for this three row ball sheave mounting means. An enclosed variable speed toothed belt drive such as used for some variable speed drive applications in the field may be used in place of the variable speed belt 59 drive shown to give effectively the same power drive shown.

The adjustable sheave disks 74 of pulleys 60 and 62 are each moved into or permitted to move into, as the case may be, and held in the desired axially adjusted position by a ball thrust bearing 102, the inner race of which is seated on member 84 in abutment with flange 82. The outer race of bearing 102 is seated in bore 104 and in abutment with radially inwardly directed flange 106 of annular pulley adjustment thrust member 108, which is axially displaceable with member 84 but which is restrained against rotation as will be explained. Member 108 is provided with thrust pads 110 which are engaged by rounded ends 112 of bell crank fork thrust arms 114 which embrace member 84. Axially outward extending projections 116 on each side of member 108 contact the ends of arms 114 to prevent rotation of member 108. Tubular projection 71 from adjustable sheave 74 telescopes within bore 73 of extended hub 68 of sheave disk 64 when sheave 74 is in the adjusted position illustrated for pulley 62. When a sheave 74 is in the adjusted position illustrated for pulley 60 projection 71 prevents belt 59 from falling below sheave surfaces 66 and 76 even if the belt had become twisted.

Bell cranks 118 and 120 are each provided with a forked projection 122 which forms the two arms 114, one on each side of the thrust member 108. Bell crank 118 for the driving varispeed pulley 60 is pivotally mounted on suitable fixed pivot pin 124 and bell crank 120 for the driven varispeed pulley 62 is pivotally mounted on suitably fixed pivot pin 126. Arm 128 of bell crank 118, which extends from pivot pin 124 at approximately right angles to a forked projection 122, is pivotally connected to clutch linkage arm 130 by pivot pin 132 and to speed variable control linkage member 134 by pivot pin 136. Arm 138 of bell crank 120, which extends from pivot pin 126 at approximately right angles to a forked projection 122, is pivotally connected to clutch linkage arm 140 by pivot pin 142.

Clutch linkage arms 130 and 140 are the same, interchangeable and reversible and are each made up of a member 144 with a threaded shank 146 which is adjustably threaded into a member 148. Arms 130 and 140 at their ends remote from bell cranks 118 and 120 are pivotally connected to clutch control thrust block 150 by pivot pins 152. Clutch control thrust rod 154 is provided with a threaded end portion 156 thread connected through block 150 and locked relative to block 150 by lock nut assembly 158. Coil spring 160 which is resiliently compressed between frame member 162 and thrust cup 164, which is welded at 166 to thrust rod 154, continually exerts thrust on rod 154 resiliently biasing it to the left as viewed in Figure 1. On the opposite side from spring 160 of frame member 162, through a slot in which rod 154 extends, rod 154 is pivotally connected by pivot pin 168 to arm 170 of right angle bell crank 172. Arm 174 of bell crank 172, which is pivotally mounted on fixed pivot pin 176, is pivotally connected by pivot pin 178 to clutch control rod 180.

Coil spring 160 supplies force through thrust rod 154, which is multiplied through linkage arms 130 and 140, to exert substantially equal force on arms 128 and 138 of respective bell cranks 118 and 120. This force is exerted in turn by bell crank projections 122 against respective pulley adjustment thrust members 108 to maintain driving engagement of pulleys 60 and 62 with belt 59.

Speed control linkage member 134 is shiftable back and forth as desired during operation between limits which limit shift of the center of pivot pin 132 from the position shown to position a. This shift is the equivalent of movement of bell crank rounded ends 112 and thrust pads 110 contact points from the position illustrated for pulley 60 to position b or the adjustment of pulley 60 from the wide open limit position shown to a closed limit position such as illustrated for pulley 62. Shift of linkage member 134 and pivot pin 132 for speed control during operation while pulleys 60 and 62 are clutched to belt 59 is transmitted through linkage arm 130, block 150 and linkage arm 140 to pivot pin 142 of bell crank 120.

Shift of pivot pin 142 shifts bell crank 120, thrust member 108 of pulley 62 and adjusts pulley 62 in like manner but in the reverse of shifts and adjustments of pulley 60. When pulley 62 is in the closed position shown, pulley 60 is in the wide open position shown, and when pulley 60 is in a closed position, pulley 62 is in a wide open position such as illustrated for pulley 60. This carries through for all speed control settings, as pulley 60 is adjusted toward a wide open setting, pulley 62 is being closed toward the closed position illustrated. The shift limit positions are determined by abutment of moveable sheave 74 against sheave 64 in the closed position of pulley 62 for one limit end, for the other limit, by the closed position of pulley 60 in like manner. The pulley settings illustrated are the settings for minimum speed transmission to pulley 62 and shaft 46. Settings for maximum speed transmission to pulley 62 are with pulley 60 closed and pulley 62 wide open.

Pull on clutch control rod 180 sufficient to pivot bell crank 172 and overcome the resilient force of coil spring 160 will declutch pulleys 62 and 60 from belt 59. Most declutching and clutching movement will generally occur with moveable sheave 74 of pulley 62, because speed control linkage member 134 will minimize clutching and declutching movement transmitted through bell crank 118.

Planetary transmission input shaft 46 is splined at 200 to planetary sun gear 202 which is axially held in place between shaft shoulder 204 and snap ring 206. Sun gear 202 meshes with planetary pinions 208 which in turn mesh with planetary internal ring gear 210. Hub 212 of ring gear 210 is provided externally with an annular shift fork receiving groove 214, which is engaged by shift fork 216 of conventional shift means assembly 218, and internally with axially extending splines 220 to permit axial shifting of ring gear 210. Ring gear splines 220 engage only splines 222 of planetary gear box output shaft 224 for planetary gear drive in one shifted position of ring gear 210 and splines 220 engage both splines 222 and clutch teeth or splines 226 of sun gear 202 in the other shifted position of ring gear 210 to provide direct drive from input shaft 46 to output shaft 224. Needle bearing 228 in bore 230 of planetary output shaft 224 provides support and coaxially pilots the respective ends of planetary input shaft 46 and shaft 224.

Planetary pinions 208 are rotatably mounted on pins 232 of carrier assembly 234 by needle bearings 236 between bearing washers 238. Pins 232 are supported by carrier member 240, the hub 242 of which is journalled on shaft 46 by needle bearing 244. Hub 242 is equipped with external splines 246 which mount axially shiftable clutch collar 248, the external annular shift groove 250 of which is engaged by shift fork 252 of shift means 218. Shift forks 216 and 252 are independently mounted on parallel independently movable shift rails. Internal splines 254 of collar 248, which continually engage splines 246 of carrier member 240, are provided with clutching ends 256 for engagement with clutch teeth 36 of input member 34 to direct drive connect member 34 to planetary carrier assembly 234. External teeth 258 of collar 248 are provided for engagement with internal teeth 260 of rotationally fixed housing mounted locking or brake ring 262. When collar 248 is shifted to engagement with ring 262 from the neutral position shown, carrier assembly 234 is rotationally fixed to provide reverse drive from input shaft 46 through the planetary gearing to output shaft 224. Ring 262 is mounted on multiple housing bridge projections 264, which project axially inward from housing end plate 42, by bolts 266. Bearing washer 267 is provided between sun gear 202 and carrier hub 242 and bearing washer 268 is provided between carrier hub 242 and shank 37 of tubular input member 34.

Planetary gear box output shaft 224 is supported by ball bearing 270 in opening 272 of housing wall 274 and by ball bearing 276 in opening 278 of transfer gearing and axle housing member 280. Transfer gear 282 of transfer gearing 20 is internally splined at 284 to output shaft splines 286. Hub 288 of brake drum 290 is internally splined 291 to output shaft splines 286 on the end of shaft 224 which extends outside of housing member 280. Hub 288, the inner race of ball bearing 276, spacer 292, transfer gear 282, spacer 294 and the inner race of ball bearing 270 are held in axially assembled relation on shaft 224 between shaft shoulder 296 and end plate 298. End plate 298 is keyed against rotation with respect to shaft 224 by pin 300 and is tightened into position by bolt 302. Snap ring 304 in groove 306 in the outer race of ball bearing 276 and shoulder 308 of cap member 310, which is fastened to housing member 280 by bolts 312, determine the axial position of bearing 276 and thereby the axial position of output shaft 224 with respect to planetary gear box housing 38. Oil seal 314 on brake drum hub 288 and within opening 316 of cap member 310 prevents loss of oil.

Transfer gear 282 meshes with transfer gear 318, which is keyed at 320 to countershaft 322. Countershaft 322 has an integral gear 324 which meshes with differential drive gear 326 which in turn is coaxially fixed by rivets 328 to differential housing flange 330 of differential 22. Countershaft 322 is supported at one end by ball bearing 332 in opening 334 of wall 274 and at the other end by ball bearing 336 in opening 338 of housing member 280. Shaft end cover 340, which is fastened to housing member 280 by bolts 342, coacts with snap ring 343 to determine the axial position of bearing 336 and counter shaft 322 in the same manner that cap member 310 determines the axial position of bearing 276 and shaft 224.

In operation in high range, approximately 5 to 14 m.p.h. in the unit shown, with planetary ring gear 210 in the shifted position shown establishing direct drive from shaft 46 to shaft 224 and with clutch collar 248 in the neutral position shown, all the power is transmitted through the variable speed belt 59.

In low range, approximately 0 to 5 m.p.h. in the unit shown, with ring gear 210 shifted to the left from the position shown in Figure 1 so that splines 220 engage only splines 222 of output shaft 224 and with clutch collar 248 shifted to engage both clutch teeth 36 and splines 246 to establish drive from input member 34 to carrier assembly 234, the power is transmitted through chain drive 12 to carrier assembly 234. Part of this power is transmitted by planetary pinions 208 directly to ring gear 210 and output shaft 224 and part as an active force applied to sun gear 202 and input shaft 46 which is simultaneously driven in the same direction at a selectable speed through variable speed drive belt 59 from driving shaft 16.

To further illustrate this new improved power drive, as used for the low range in the unit shown, I will set up an equation:

Label the ratio of the planetary gear train, $R_1$ (when the sun gear 202 is stationary and the carrier 234 is the driving member).

Label the ratio of the chain drive driving gear (sprocket) 28 to the driven gear (sprocket) 30, $R_2$.

Label the ratio of sun gear 202 to ring gear 210, $R_3$.

Label the ratio of variable speed belt drive driving pulley 60 to the driven pulley 62, $R_4$.

It follows then that the ratio R of the unit from drive shaft 16 to planetary output shaft 224 is equal to:

$$(R_1)(R_2) - (R_3)(R_4)$$

In the unit shown $$R_1 = \frac{64+38}{64};\ R_2 = \frac{28}{46};\ R_3 = \frac{38}{64} \text{ and } R$$

and $R_4$ is variable for any speed ratio between 0.6 and 1.67. When $R_4$ is equal to 1.67, in other words a setting for maximum speed transmission to pulley 62 and input shaft 46, $R=0$ and zero times the input speed of drive shaft 16 gives zero output speed. When $R_4$ is equal to 0.6, in other words a setting for minimum speed transmission to pulley 62 and input shaft 46, $R=0.61$. This means that planetary output shaft 224 is rotating at 0.61 times the speed of rotation of drive shaft 16 which gives a maximum vehicle speed in low range of a little over 6 m.p.h.

In reverse range, approximately 3 to 8.5 m.p.h. in the unit shown, with ring gear 210 shifted so that splines 220 engage only splines 222 of output shaft 224 and with clutch collar 248 shifted to engage both splines 246 of hub 242 and splines 260 of rotationally fixed ring 262 to rotationally fix carrier assembly 234, all the power is transmitted through the variable speed belt 59. Rotation of input shaft 46 and sun gear 202 is reversed through planetary pinions 208 in rotation about carrier pins 232 to impart reverse rotation of ring gear 210 and output shaft 224.

Referring again to the equation $$R = (R_1)(R_2) - (R_3)(R_4)$$

explained above as applicable to the low range drive of the unit shown, it is seen that the first product $(R_1)(R_2)$ is larger than or equal to the second product $(R_3)(R_4)$ and that output shaft 224 revolves, if at all, in the same direction as the input shaft 46 and input member 34. If, however, the first product is smaller and R is equal to a minus quantity, the output shaft 224 will revolve in the reverse direction. In the unit illustrated, if the maximum speed transmission ratio to pulley 62 were increased above $R_4$ equal to 1.67, for all $R_4$ values above 1.67 the vehicle would be in reverse and, with progressively higher $R_4$ values above 1.67, faster vehicle reverse speeds. The power drive in this reverse is different than that described above for low range forward drive. In this reverse drive the power is transmitted through variable speed drive belt 59, the input shaft 46 and sun gear 202 to planetary pinions 208 which transmit part of the power to ring gear 210 and output shaft 224 and part of the power to carrier assembly 234 and input member 34 and through chain drive 12 back to driving shaft 16.

This same reverse gear drive could be attained by increasing the chain drive driving gear 28 to the driven gear 30 ratio $R_2$ in the unit shown. After ratio R of the unit from shaft 16 to shaft 224 is passed through the zero value for an $R_4$ ratio between 0.6 and 1.67, and, as the $R_4$ ratio is increased progressively toward the maximum ratio 1.67, the vehicle is in reverse and with progressively increasing vehicle reverse speeds up to the maximum.

It is possible to provide such a power drive with no clutch means within the planetary gear box in which tubular input member 34 would be connected to the carrier assembly 234 and the ring gear 210 only to output shaft 224. It would have an infinite number of speeds from a certain maximum speed in forward to a certain maximum speed in reverse of which any speed required may be selected through a single speed variable control linkage member such as member 134 in the unit shown. Further possible power drives would have two variable speed drive sections with chain drive 12 changed instead to a variable speed belt drive such as, and in addition to, variable belt drive 14 or possibly a power drive in which chain drive 12 and variable speed belt drive 14 are interchanged.

From the foregoing it is apparent that there is hereby provided a new improved harvester combine power drive with a high range of vehicle speeds for highway travel from job to job, a low range of vehicle speeds for harvesting operation and a reverse speed range. It provides an infinitely variable speed mechanical transmission. It also provides a variable speed power drive with an infinite number of speeds from a maximum speed in forward to a maximum speed in reverse any speed of which may be selected by a single speed lever control. An improved variable speed V belt pulley moveable sheave anti-friction speed control mounting is also provided.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. In combination, a planetary gear mechanism having a sun gear, a carrier, a ring gear and a plurality of planetary pinions journalled on said carrier each in constant mesh with both said sun gear and said ring gear; an engine driven shaft, positive drive means between said shaft and said carrier, variable speed drive means between said shaft and said sun gear independent of said positive drive means, speed control means for said variable speed drive means, output means, and selectively operable coupling means enabling alternative selective clutching of said output means to be driven by said ring gear or directly by said variable speed drive means.

2. In the power drive defined in claim 1, said selectively operable coupling means comprising: a rotationally fixed braking member; a first clutch means operable through a neutral position to connect said carrier to said positive drive means or to said braking member; and a second clutch means alternatively operable to connect a drive from said ring gear through said planetary gear mechanism, or to connect a direct drive from the output of said variable speed drive means, to said output means so a high speed range drive is provided when said positive drive means is declutched from said planetary carrier and said variable speed drive means is clutched by said second clutch means in direct drive to said output means, a low speed range drive is provided when said positive drive means is clutched by said first clutch means to said carrier and said second clutch means is shifted to establish drive connection from said planetary ring gear to said output means, and a range of speeds in reverse is provided with said carrier connected by said first clutch means to said braking member and said second clutch means is shifted to establish planetary drive.

3. In the combination defined in claim 1, said positive drive means comprising a drive sprocket non-rotatably mounted on said drive shaft, a driven sprocket drive connected to said carrier, and a chain drive connecting said drive and driven sprockets.

4. In the combination defined in claim 1, said variable speed drive means comprising a variable speed pulley assembly driven by said drive shaft, a variable speed pulley assembly drive connected to said sun gear, and a belt drive connecting said pulley assemblies.

5. In the combination defined in claim 1 said variable speed drive means being selectively operative throughout a predetermined range for driving said sun gear at an infinite number of speeds within such range, the range of speed of drive of said sun gear being such in relation to the speed of said carrier as to provide the power from said drive shaft to said output means with a range of output speeds from a predetermined maximum speed output in forward when said variable speed drive means is at minimum speed ratio to a predetermined maximum speed output in reverse when said variable speed drive is a maximum speed ratio.

6. In the combination defined in claim 2 when in said low speed range drive wherein the range of speed of said sun gear in relation to the speed of said carrier is such that said output means is at a maximum speed in forward when said variable speed drive means is at minimum speed ratio, and said output means is at a minimum speed in forward when said variable speed drive means is at maximum speed ratio.

References Cited in the file of this patent

UNITED STATES PATENTS

| | | |
|---|---|---|
| 912,736 | Ruck | Feb. 16, 1909 |
| 1,230,450 | Vincent | June 19, 1917 |
| 2,201,357 | Twomley | May 21, 1940 |
| 2,446,462 | Dodge | Aug. 3, 1948 |
| 2,478,870 | Heyer | Aug. 9, 1949 |
| 2,509,685 | Hughes | May 20, 1950 |
| 2,637,220 | Alspaugh | May 5, 1953 |
| 2,754,691 | May | July 17, 1956 |
| 2,755,683 | Ryan | July 24, 1956 |
| 2,760,386 | Southwick | Aug. 28, 1956 |

FOREIGN PATENTS

| | | |
|---|---|---|
| 473,170 | Italy | July 15, 1952 |